(12) United States Patent
Wei et al.

(10) Patent No.: US 8,810,870 B2
(45) Date of Patent: Aug. 19, 2014

(54) SCANNING DEVICE

(71) Applicant: Cal-Comp Electronics & Communications Company Limited, New Taipei (TW)

(72) Inventors: Chung-Hsin Wei, New Taipei (TW); Hung-Huan Sung, New Taipei (TW)

(73) Assignee: Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 13/761,181

(22) Filed: Feb. 7, 2013

(65) Prior Publication Data

US 2014/0160539 A1 Jun. 12, 2014

(30) Foreign Application Priority Data

Dec. 12, 2012 (TW) .............................. 101146950 A

(51) Int. Cl.
*H04N 1/04* (2006.01)
*H04N 1/00* (2006.01)

(52) U.S. Cl.
CPC ................................ *H04N 1/00519* (2013.01)
USPC ............................ 358/474; 358/497; 358/501

(58) Field of Classification Search
CPC ... H04N 1/0083; H04N 1/1013; H04N 1/103; H04N 2201/0081; H04N 2201/04725; H04N 1/04; H04N 1/1026; H04N 1/00557; H04N 1/00907; H04N 2201/0093; H04N 2201/044; G03G 21/1652; G03G 15/00; G03G 15/60
USPC ........ 358/1.13, 1.14, 2.1, 406, 474, 494, 497, 358/498, 482, 1.12, 1.15, 296, 461, 475
See application file for complete search history.

(56) References Cited

U.S. PATENT DOCUMENTS

| 6,512,603 | B2 * | 1/2003 | Saito | 358/509 |
|---|---|---|---|---|
| 7,161,716 | B1 * | 1/2007 | Kawasaki et al. | 358/497 |
| 7,755,814 | B2 * | 7/2010 | Tamai et al. | 358/497 |
| 7,969,621 | B2 * | 6/2011 | Shunji | 358/474 |
| 7,978,380 | B2 * | 7/2011 | Ohama et al. | 358/494 |
| 8,149,472 | B2 * | 4/2012 | Ono | 358/474 |
| 8,243,345 | B2 * | 8/2012 | Kim | 358/474 |
| 8,270,045 | B2 * | 9/2012 | Iwata | 358/497 |
| 8,300,279 | B2 * | 10/2012 | Mukai et al. | 358/474 |
| 8,531,739 | B2 * | 9/2013 | Kitai | 358/474 |
| 8,547,604 | B2 * | 10/2013 | Kozaki et al. | 358/474 |
| 2009/0244655 | A1 * | 10/2009 | Mukai et al. | 358/474 |

FOREIGN PATENT DOCUMENTS

TW 530481 5/2003

* cited by examiner

*Primary Examiner* — Negussie Worku
(74) *Attorney, Agent, or Firm* — Jianq Chyun IP Office

(57) ABSTRACT

A scanning device including a body, a transparent cover, a scanning module, a flat-cable and a pressing unit is provided. The body has a space, a first inner-side and a second inner-side. The transparent cover covers on the body to hide the space. The scanning module disposed in the space is capable of moving back and forth between the first and the second inner-sides. The flat-cable is disposed in the space and connected with the scanning module and the body. The pressing unit is pivotally connected on the scanning module with a side thereof, so that another side of the pressing unit without being pivotally connected on the scanning module leans against on the flat-cable through the weight itself to suppress the flat-cable, so as to prevent the flat-cable from contacting with the transparent cover when the scanning module moves back and forth between the first and the second inner-sides.

10 Claims, 4 Drawing Sheets

(54) SCANNING DEVICE

CROSS-REFERENCE TO RELATED APPLICATION

This application claims the priority benefit of Taiwan application serial no. 101146950, filed on Dec. 12, 2012. The entirety of the above-mentioned patent application is hereby incorporated by reference herein and made a part of this specification.

BACKGROUND

1. Technical Field

The invention relates to a scanning device. More particularly, the invention relates to a scanning device having a scanning module that operates smoothly.

2. Background

Along with increasing advancement of computer performance, rapid development of Internet and multimedia technologies, an optical scanner, other than a digital camera (DC), can be used for an image inputting system for other related documents or pictures by capturing analog images of words or pictures and converting the analog images to digital signals for outputting. Consequently, the optical scanner provides functions for displaying, identifying, editing, saving and outputting image files on a computer or other electronic products for users.

A contemporary scanning device usually scans the documents placed on a transparent glass for scanning and moves an optical scanning module which is driven by a transmission mechanism and located in the scanning device, so as to scan images of documents by utilizing an image reading unit of an optical scanning module to form analog image signals and output digital image signals generated correspondingly. When the optical scanning module scans documents or pictures for capturing images, image signals are usually transmitted to a circuit board through a flat cable, for the circuit board to process and output the image signals. The flat cable is connected between the optical scanning module and the circuit board which is secured in the scanning device, and the flat cable usually moves along with movements of the optical scanning module and is bended. In addition, a curvature radius of the flat cable usually increases so much that the flat cable contacts with a transparent glass and further prevents the optical scanning module from moving smoothly.

SUMMARY

The invention provides a scanning device having smooth operations.

The invention provides a scanning device including a body, a transparent cover, a scanning module, a flat-cable and a pressing unit. The body has a space, a first inner-side and a second inner-side opposite to the first inner-side. The transparent cover covers on the body to hide the space. The scanning module is disposed in the space and is capable of moving back and forth between the first inner-side and the second inner-side along an axial direction. The flat-cable is disposed in the space and connected with the scanning module and the body. The pressing unit is pivotally connected on the scanning module with a side thereof, so that the other side of the pressing unit without being pivotally connected on the scanning module leans against on the flat-cable through a weight of the pressing unit to suppress the flat-cable, so as to prevent the flat-cable from contacting with the transparent cover when the scanning module moves back and forth between the first inner-side and the second inner-side.

In summary, the scanning device of the invention has a pressing unit disposed on a flat-cable connecting a scanning module and a body, wherein one side of the pressing unit is pivotally connected on the scanning module and the pressing unit leans against on the flat-cable through a weight of the pressing unit to suppress the flat-cable so as to prevent the flat-cable from contacting with a transparent cover when the scanning module moves back and forth between a first inner-side and a second inner-side. Consequently, the scanning device has smooth operations.

In order to make the above features and advantages of the invention more comprehensible, several exemplary embodiments accompanied with figures are described in details below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the invention.

DESCRIPTION OF EMBODIMENTS

Figure 1:
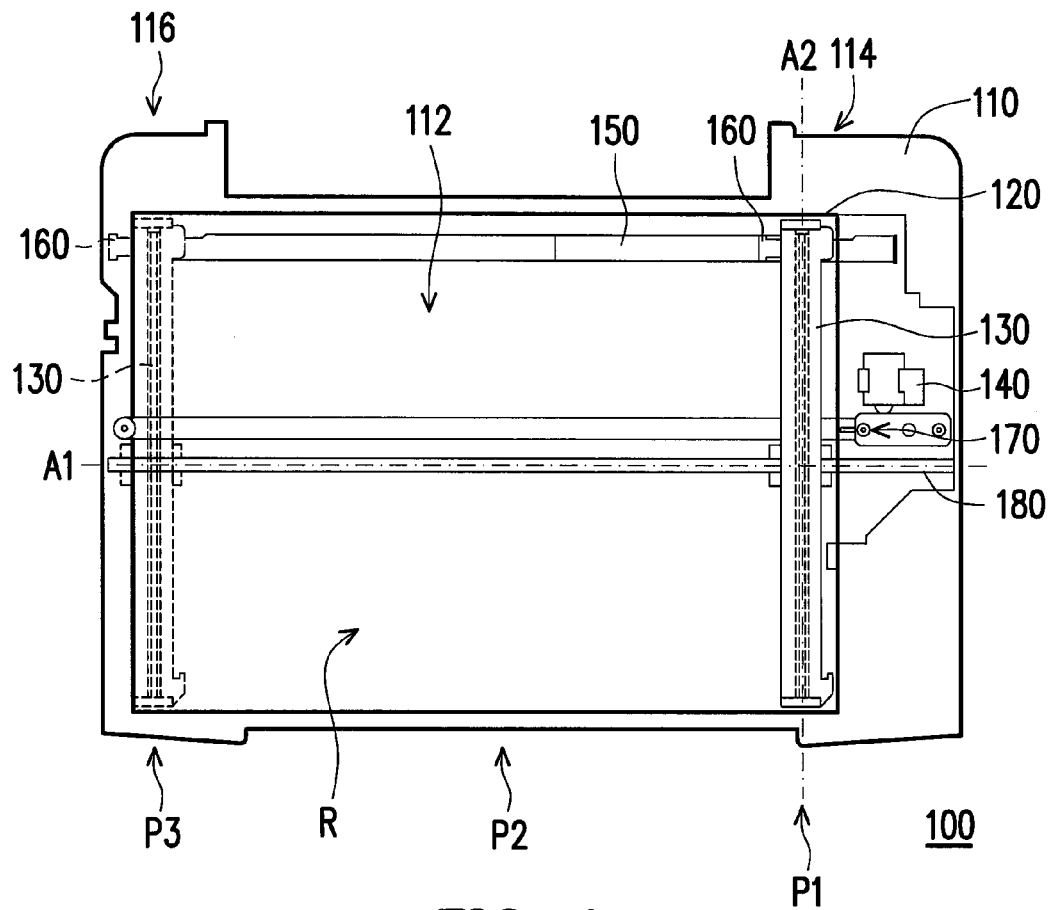
FIG. 1 is a top view illustrating a scanning device according to an embodiment of the invention.

FIG. 1 is a top view illustrating a scanning device according to an embodiment of the invention. Referring to FIG. 1. In the present embodiment, a scanning device 100 includes a body 110, a transparent cover 120, a scanning module 130, a driving module 140, a flat-cable 150 and a pressing unit 160. The body 110 has a space 112, a first inner-side 114 and a second inner-side 116 opposite to the first inner-side 114. The transparent cover 120 covers on the body 110 to hide the space 112. In order to make the figure more clearly illustrated, the body 110 and the transparent cover 120 in FIG. 1 are illustrated in bold lines, and the other components illustrated are in fine lines, such as the scanning module 130, the driving module 140, the flat-cable 150, etc. Any component in fine lines represents that the component is disposed in the space 112 or is hided by the transparent cover 120.

Specifically speaking, the driving module 140 and the scanning module 130 are both disposed in the space 112, and the driving module 140 connects to the scanning module 130 for driving the scanning module 130 to move back and forth between the first inner-side 114 and the second inner-side 116 along an axial direction A1. In the present embodiment, the scanning module 130 is disposed on a moving axis 180. The moving axis 180 is also located in the space 112, and an axis (not marked herein) of the moving axis 180 is parallel to or overlap with the axis direction A1, and a belt 170 connects to the scanning module 130 and the driving module 140, such that the scanning module 130 which is driven by the driving module 140 and carried by the belt 170 is capable of moving back and forth between the first inner-side 114 and the second side 116 along the moving axis 180.

In the present embodiment, an initial position P1, a mid position P2 and a final position P3 along the axis direction A1 of the scanning module 130 of the body 110 are defined, wherein the initial position P1 is located at the first inner-side 114, the final position P3 is located at the second inner-side 116, and the mid position P2 is located between the initial position P1 and the final position P3. However, in other embodiments, a scanning mode of a scanning module can move from the second inner-side to the first inner-side, that is, the initial position of the scanning module is located at the second inner-side, and the final position of the scanning module is located at the first inner-side. The invention is not limited herein.

Additionally, in the present embodiment, an installation of the scanning module 130, for example, is represented as a rectangular shape, and a length direction A2 of the rectangular shape is vertical to the axis direction A1. For example, a plurality of optical lens used for capturing images or other components having similar functions in the scanning module 130 are disposed and arranged along the length direction A2, such that the scanning module 130 moves back and forth between the first inner-side 114 and the second inner-side 116 along the axis direction A1 to define a scanning region R, and the scanning region R corresponds to the transparent cover 120.

Therefore, When an object is placed on the transparent cover 120 and corresponds to the scanning region R, such that an image can be captured through scanning by having the scanning module 130 moving from the initial position P1 (located at the first inner-side 114) to the final position P3 (located at the second inner-side 116). In this way, the scanning module 130 captures the image of the object that is placed on the transparent cover 120 so as to further save the image as an electronic file or print out the image by connecting to a printing device. It should be also mentioned that, although the scanning module 130 of the present embodiment is installed as a rectangular shape, but the invention is not limited herein. People of ordinary skill in the art can change installation ways of each component of a scanning module based on their practical needs under the situation that functions and moving directions of the scanning module is not impacted.

In the present embodiment, the flat-cable 150 is disposed in the space 112 and connected with the scanning module 130 and the body 110. Specifically speaking, the flat-cable 150 is a flexible flat cable (FCC), and the flat-cable 150 is further connected to a circuit board (not illustrated herein) disposed in the body 110. Consequently, the scanning module 130, which is driven by the driving module 140, is capable of moving back and forth between the first inner-side 114 and the second inner-side 116 along the axis direction A1, and transmits an image captured by the scanning module 130 to the circuit board via the flat-cable 150 so as to process the image.

Figure 2:
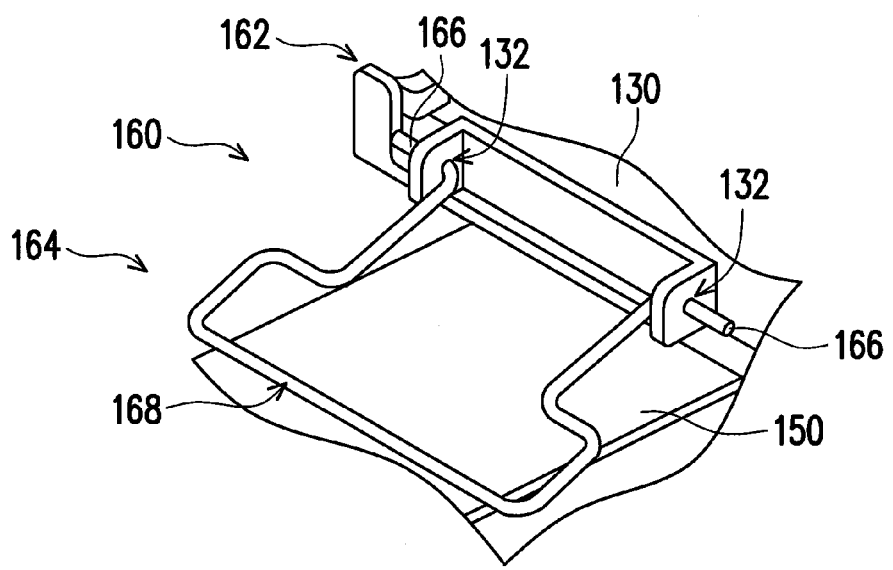
FIG. 2 is a schematic view of the pressing unit of FIG. 1.

FIG. 2 is a schematic view of the pressing unit of FIG. 1. Referring to FIGS. 1 and 2. When the scanning module 130 is in a process of moving back and forth between the first inner-side 114 and the second inner-side 116 along the axis direction A1, the scanning module 130 and the body 110 move relatively and the flat-cable 150 connecting with the scanning module 130 also moves accordingly. Consequently, in the present embodiment, the pressing unit 160 is pivotally connected on the scanning module 130 with a side thereof (i.e. with a first side 162 of the pressing unit 160), so that the other side of the pressing unit 160 (i.e. a second side 164 of the pressing unit 160) without being pivotally connected on the scanning module 130 leans against on the flat-cable 150 through a weight of the pressing unit 160 to suppress the flat-cable 150, so as to prevent the flat-cable 150 from contacting with the transparent cover 120 when the scanning module 130 moves back and forth between the first inner-side 114 and the second inner-side 116.

Referring to FIG. 2. In the present embodiment, the pressing unit 160 has two fixing portions 166 and a holding portion 168 between the two fixing portions 166, and the scanning module 130 has two corresponding fixing holes 132. The pressing unit 160 is pivotally connected to the scanning module 130 by having two fixing portions 166 correspondingly going through two fixing holes 132, so as to rotate in relative to the scanning module 130, and the pressing unit 160 leans against on the flat-cable 150 through the holding portion 168. In other words, the two fixing portions 166 of the pressing unit 160 can be deemed as the first side 162 of the pressing unit 160 and pivotally connected to the scanning module 130, and the holding portion 168 of the pressing unit 160 can be deemed as the second side 164 of the pressing unit 160 and leans against on the flat-cable 150.

Additionally, in the present embodiment, the pressing unit 160, for example, is formed by a bending line segment, wherein two ends of the bending line segment form the two fixing portions 166 that correspondingly go through two fixing holes 132, and a mid portion of the bending line segment forms the holding portion 168 and leans against on the flat-cable 150. Consequently, when the pressing unit 160 leans against on the flat-cable 150 through the weight of the pressing unit 160, the holding portion 168 of the pressing unit 160 leans against on the flat-cable 150 in a way of a line contact. However, in other embodiments, a pressing unit can be a baffle pivotally connected to a scanning module and linearly contacted with a flat-cable, or other components having similar functions. The invention is not limited in ways of forming a pressing unit and detailed structures.

Accordingly, the pressing unit 160 is pivotally connected on the scanning module 130 with the first side 162, so that the second side 164 of the pressing unit 160 leans against on the flat-cable 150 through the weight of the pressing unit 160 to suppress the flat-cable 150, so as to prevent the flat-cable 150 from contacting with the transparent cover 120. Furthermore, when the scanning module 130 moves between the first inner-side 114 and the second inner-side 116, the scanning module 130 makes a curvature radius of the flat-cable 150 vary, and the pressing unit 160 is capable of maintaining a leaning position against on the flat-cable 150 and suppressing the flat-cable 150 when the scanning module 130 moves back and forth between the first inner-side 114 and the second inner-side 116, so as to prevent the flat-cable 150 from contacting with the transparent cover 120. The following FIGS. 3A to 5B are presented to describe movements of the scanning module 130 and the flat-cable 150 as well as a suppressing method of the pressing unit 160.

Figure 3A:
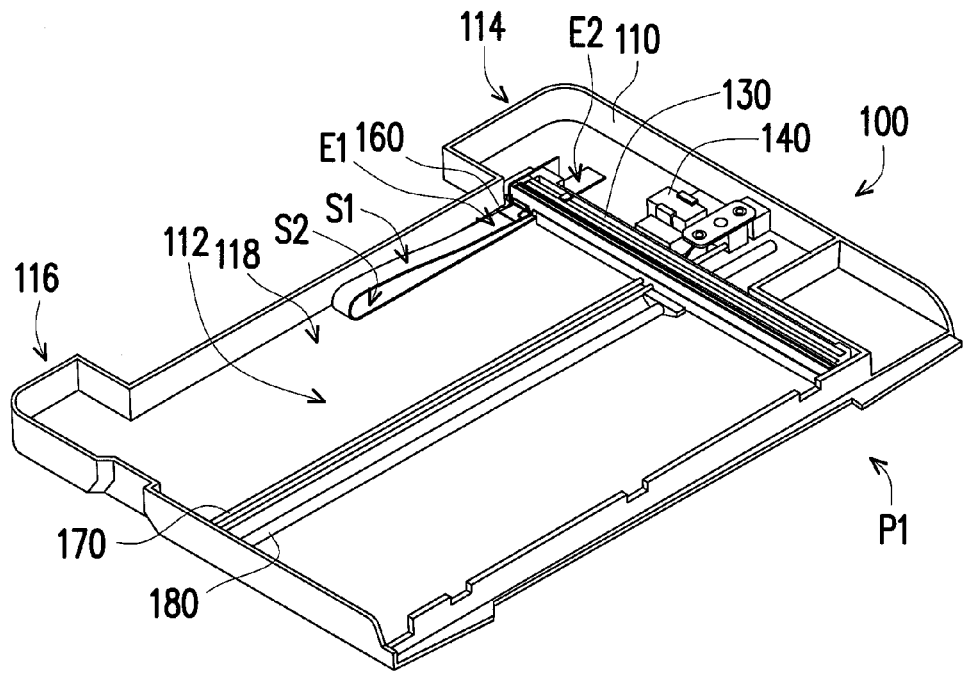
FIG. 3A is a schematic view illustrating a scanning module located at an initial position of a scanning device of FIG. 1.
Figure 3B:
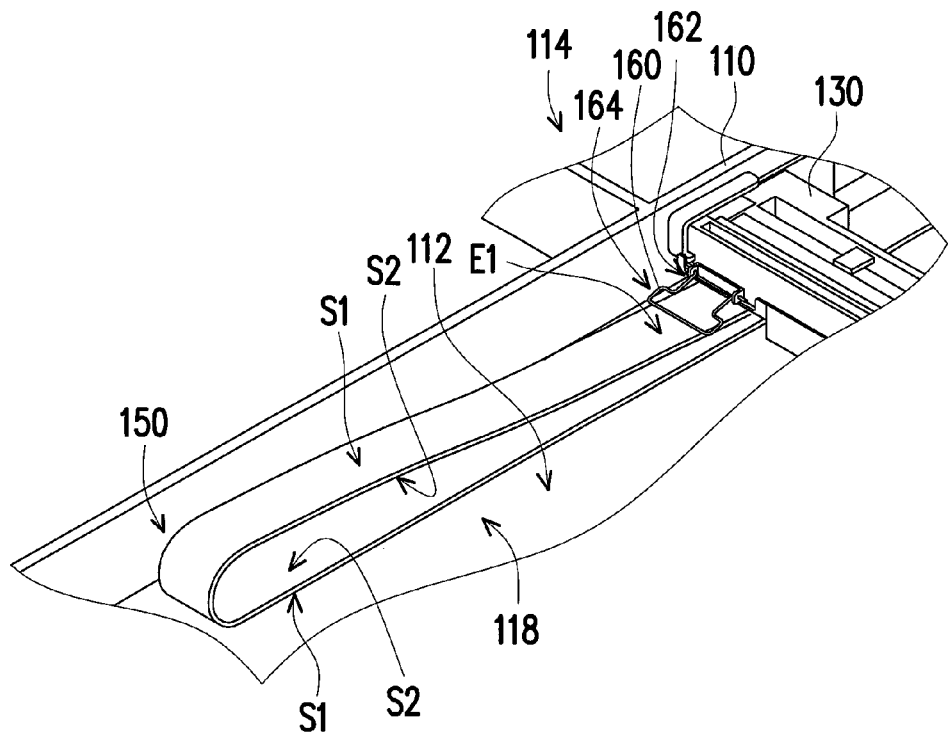
FIG. 3B is an enlarged partial view of the scanning device of FIG. 3A.

FIG. 3A is a schematic view illustrating a scanning module located at an initial position of a scanning device of FIG. 1. FIG. 3B is an enlarged partial view of the scanning device of FIG. 3A. In order to make the figures more clearly illustrated, the scanning device 100 illustrated in FIGS. 3A to 5B all omit the illustrations of the transparent cover 120 and a portion of the body 110, such that components disposed in the space 112 can be clearly presented. Referring to FIGS. 1, 3A and 3B. In the present embodiment, the flat-cable 150 has a first end E1 and a second end E2 opposite to the first end E1. The first end E1 of the flat-cable 150 connects to the scanning module 130, such that the pressing unit 160 of the scanning module 130 leans against on the first end E1 of the flat-cable 150. Additionally, the second end E2 of the flat-cable 150 connects with the first inner-side 114 of the body 110. As a result, the flat-cable 150 is in a bending state when the scanning module 130 is located at the first inner-side 114. However, in other embodiments, a flat-cable may be connected to the second inner-side by the second end, such that the flat-cable is in a straight state when the scanning module is located at a first inner-side. In other words, a connecting location of a flat-cable can be adjusted based on types of a scanning module and needs for usages. The invention is not limited therein.

Specifically speaking, in the present embodiment, the flat-cable 150 has a first surface S1 and a second surface S2 opposite to the first surface S1. When the scanning module 130 is located at the initial position P1 of the first inner-side 114, the first end E1 of the flat-cable 150 is adjacent to the second end E2, such that the flat-cable 150 is in a bending state. In other words, the second end E2 can extend forward from the first end E1 and go through under the scanning module 130 so as to connect to the first inner-side 114 of the body 110, and a length of the flat-cable 150 is long enough for the scanning module 130 connecting to the flat-cable 150 to move from the first inner-side 114 to the second inner-side 116. When the scanning module 130 is located at the first inner-side 114 (the initial position P1), the flat-cable 150 is in a bending state, wherein the flat-cable 150 is located at the first surface S1 of the first end E1 and faces the transparent cover 120, and the second surface S2 located at the first end E1 faces the second surface S2 located at the second end E2.

On the other hand, a portion of the first surface S1 of the second end E2 of the flat-cable 150 is secured at a bottom portion 118 of the body 110 to prevent the flat-cable 150 from shifting unexpectedly and interfering with the scanning module 130 or other components that has impacts on operations of the scanning device 100. Furthermore, when the scanning module 130 moves between the first inner-side 114 and the second inner-side 116, the second side 164 of the pressing unit 160 leans against on the first surface S1 located at the first end E1 so as to decrease a curvature radius of the flat-cable 150 in a bending state and further prevent a bending flat-cable 150 from contacting with the transparent cover 120 when the scanning module 130 moves back and forth between the first inner-side 114 and the second inner-side 116.

Figure 4A:
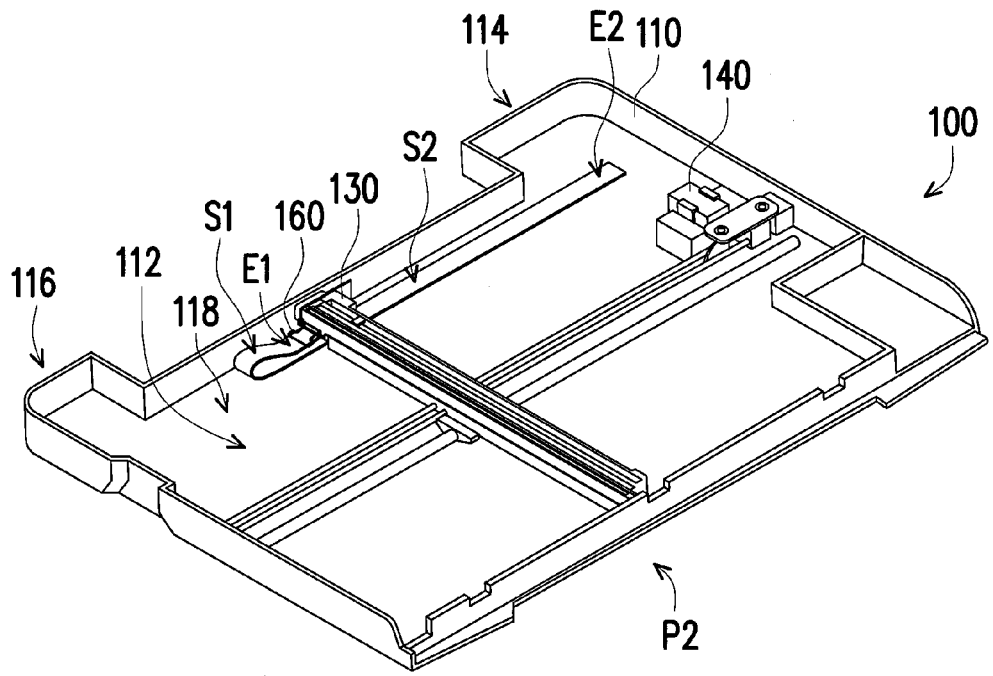
FIG. 4A is a schematic view of a scanning module located at the mid-position of the scanning device of FIG. 1.
Figure 4B:
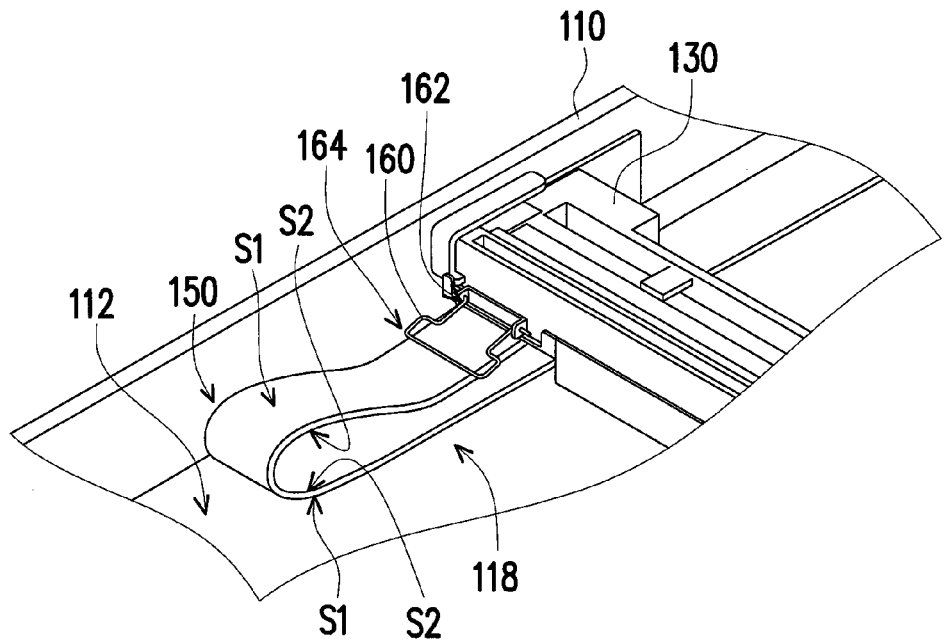
FIG. 4B is an enlarged partial view of the scanning device of FIG. 4A.

FIG. 4A is a schematic view of a scanning module located at the mid-position of the scanning device of FIG. 1. FIG. 4B is an enlarged partial view of the scanning device of FIG. 4A. Referring to FIGS. 4A and 4B. When the scanning module 130 moves from the initial position P1 located at the first inner-side 114 toward the mid position P2 at the second inner-side 116, the first end E1 of the flat-cable 150 gradually leaves the second end E2, such that the first surface S1 located at the first end E1 of the flat-cable 150 is gradually unfolded toward the second inner-side 116 and is gradually becoming attaching to the bottom portion 118 from facing the transparent cover 120. For the time being, although the flat-cable 150 is still in a bending state, a curvature radius of the flat-cable 150 has been changed with a relative movement between the first end E1 and the second end E2 of the flat-cable 150. Consequently, the pressing unit 160, by a way of pivotal connection, allows the second side 164 to rotate in relative to the scanning module 130 by adopting the first side 162 as a center of rotation.

Specifically speaking, the pressing unit 160 rotates in relative to the scanning module 130 according to variations of curvature radius of the flat-cable 150. When the curvature radius of the flat-cable 150 increases, the pressing unit 160 is pushed by the flat-cable 150 and a height of a side (the second side 164) of the pressing unit 160 without being pivotally connected on the scanning module 130 increases relative to a surface of the body 110. When a curvature radius of the flat-cable 150 decreases, a height of the second side 164 of the pressing unit 160 decreases in relative to the surface of the body 110. It should be mentioned that, although a height of the second side 164 changes in relative to a surface of the body 110 due to variations of a curvature radius of the flat-cable 150, the pressing unit 160 continues leaning against on the flat-cable 150 through the weight of the pressing unit 160 all the time during a moving process of the scanning module 130. When compared to embodiments without the pressing unit 160, the pressing unit 160 can reduce a curvature radius of the flat-cable 150 to reduce a height of a bending portion of the flat-cable 150 and further to prevent the flat-cable 150 from contacting with the transparent cover 120 when the scanning module 130 moves back and forth between the first inner-side 114 and the second inner-side 116.

Figure 5A:
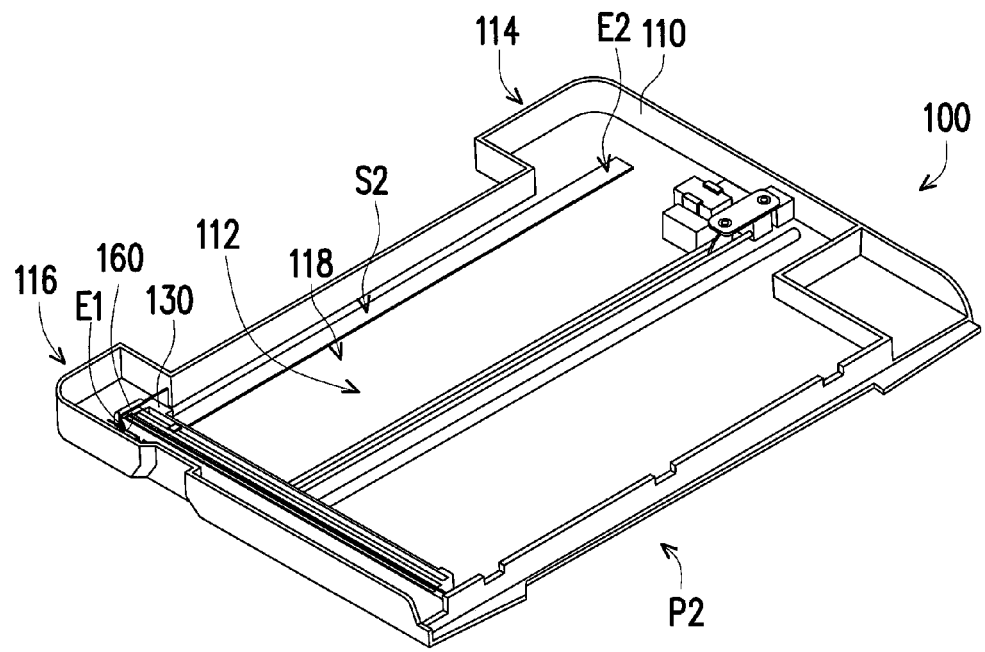
FIG. 5A is a schematic view of the scanning module located at a final position of the scanning device of FIG. 1.
Figure 5B:
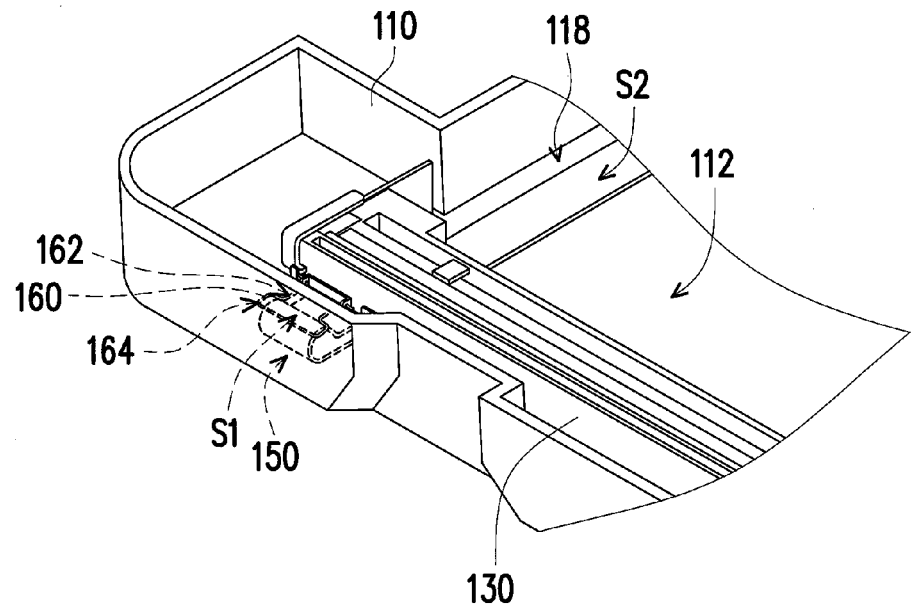
FIG. 5B is an enlarged partial view of the scanning device of FIG. 5A.

FIG. 5A is a schematic view of the scanning module located at a final position of the scanning device of FIG. 1. FIG. 5B is an enlarged partial view of the scanning device of FIG. 5A. Referring to FIGS. 5A and 5B. In the present embodiment, when the scanning module 130 moves from the first inner-side 114 to the second inner-side 116 and is located at the final position P3, the first end E1 of the flat-cable 150 moves with the scanning module 130 to the second inner-side 116, such that the flat-cable 150 once in a bending state is now in a straight state. However, the flat-cable 150 of the present embodiment connects on the scanning module 130 with the first end E1, faces a lateral face of the second inner-side 116, and goes through under the scanning module 130 to connect to the first inner-side 114. Accordingly, when the first end E1 of the flat-cable 150 moves with the scanning module 130 toward the second inner-side 116 for the flat-cable to be in a straight state, the first surface S1 of most portions of the flat-cable 150 faces the bottom portion 118, and only a portion of the first end E1 connecting with the scanning module 130 is in a slightly bending state, as shown in FIG. 5B.

For the time being, the portion of the first end E1 of the flat-cable 150 is in a bending state and the pressing unit 160 continues leaning against on the flat-cable 150 by the second side 164 through the weight of the pressing unit 160. The flat-cable 150 in a straight state does not contact with the transparent glass cover 120, and the pressing unit 160 continues leaning against on a portion of the first end E1 in a bending state of the flat-cable 150 to prevent the flat-cable 150 from contacting with the transparent cover 120. At this step, the scanning device 100 completes a scanning.

After the scanning device 100 completes the scanning, the scanning module 130 which is driven by the driving module 140 and carried by the belt 170 moves to the initial position P1 starting from the final position P3 and passing the mid position P2 along the moving axis 180, so as to perform next scanning. For the time being, the first end E1 and the second end E2 of the flat-cable 150 are gradually getting closer, such that the flat-cable 150 is in a bending state. In addition, the curvature radius of the flat-cable 150 changes with movements of the flat-cable 150, and a course is shown as FIGS. 5A to 4A and FIGS. 4A to 3A. In the course, the pressing unit 160 continues leaning against on the flat-cable 150 to prevent the flat-cable 150 from contacting with the transparent cover 120.

In summary, the scanning device of the invention has a pressing unit disposed on a flat-cable connecting a scanning module and a body, wherein one side of the pressing unit is pivotally connected on the scanning module and the other side of the pressing unit without pivotally connected on the scanning module leans against on the flat-cable through the weight of the pressing unit to suppress the flat-cable. When the scanning module moves back and forth between the first inner-side and the second inner-side and the flat-cable moves with the scanning module accordingly, the pressing unit continues leaning against on the flat-cable to prevent the flat-cable from contacting with the transparent cover when the scanning module moves back and forth between the first inner-side and the second inner-side, such that a movement of the scanning device is not impacted. Consequently, the scanning device of the invention operates smoothly.

Although the disclosure has been disclosed by the above embodiments, they are not intended to limit the disclosure. It will be apparent to people of ordinary skill in the art that modifications and variations to the structure of the disclosed embodiments may be made without departing from the spirit and the scope of the disclosure. Accordingly, the protection scope of the disclosure falls in the appended claims.

What is claimed is:

1. A scanning device, comprising:
    a body having a space, a first inner-side and a second inner-side opposite to the first inner-side;
    a transparent cover covering on the body to hide the space;
    a scanning module disposed in the space and capable of moving back and forth between the first inner-side and the second inner-side along an axial direction;
    a flat-cable disposed in the space and connected with the scanning module and the body; and
    a pressing unit pivotally connected on the scanning module with a side thereof, so that the other side of the pressing unit without being pivotally connected on the scanning module leans against on the flat-cable through a weight of the pressing unit to suppress the flat-cable so as to prevent the flat-cable from contacting with the transparent cover when the scanning module moves back and forth between the first inner-side and the second inner-side.

2. The scanning device as recited in claim 1, further comprising:
    a driving module disposed in the space and connected with the scanning module for driving the scanning module to move back and forth between the first inner-side and the second inner-side along the axial direction.

3. The scanning device as recited in claim 1, wherein the flat-cable has a first end and a second end opposite to the first end, the flat-cable is connected with the scanning module by the first end, and the flat-cable is connected with the first inner-side or the second inner-side by the second end.

4. The scanning device as recited in claim 3, wherein the flat-cable has a first surface and a second surface opposite to the first surface, and when the scanning module is located at the first inner-side and the flat-cable is in a bending state, the second surface located at the first end faces the second surface located at the second end, and the pressing unit leans against the first surface located at the first end.

5. The scanning device as recited in claim 4, wherein a portion of the first surface of the flat-cable located at the second end is secured at a bottom portion of the body.

6. The scanning device as recited in claim 1, wherein the scanning module moves back and forth between the first inner-side and the second inner-side along the axial direction to define a scanning region, and the scanning region corresponds to the transparent cover.

7. The scanning device as recited in claim 1, wherein the pressing unit is pivotally connected on the scanning module and rotates in relative to the scanning module, and when the scanning module moves between the first inner-side and the second inner-side, a curvature radius of the flat-cable changes with movements of the scanning module, a height of the side of the pressing unit without being pivotally connected on the scanning module varies with the curvature radius of the flat-cable relative to a bottom portion of the body.

8. The scanning device as recited in claim 7, wherein the pressing unit has two fixing portions and a holding portion located between the two fixing portions, the scanning module has two corresponding fixing holes, the pressing unit is pivotally connected to the scanning module by having the two fixing portions correspondingly going through two fixing holes so as to rotate in relative to the scanning module, and the holding portion of the pressing unit leans against on the flat-cable.

9. The scanning device as recited in claim 8, wherein the holding portion of the pressing unit leans against on the flat-cable in a way of a line contact.

10. The scanning device as recited in claim 8, wherein the pressing unit is a bending line segment, two ends of the bending line segment form the two fixing portions that correspondingly go through two fixing holes, and a mid portion of the bending line segment forms the holding portion.

* * * * *